United States Patent [19]

Rosenberg

[11] 4,288,035

[45] Sep. 8, 1981

[54] FLUID FLOW CONTROL DEVICE PARTICULARLY USEFUL AS A DRIP-IRRIGATION EMITTER

[76] Inventor: Avner Rosenberg, Moshav Beit Shearim, Israel

[21] Appl. No.: 100,979

[22] Filed: Dec. 6, 1979

[51] Int. Cl.³ .............................................. B05B 15/00
[52] U.S. Cl. ..................................... 239/271; 239/542
[58] Field of Search .................... 138/40, 46; 137/500; 239/271, 272, 533.1, 542, 547, 570, 101

[56] References Cited

U.S. PATENT DOCUMENTS 3,642,026  2/1972  Sielaff ................................ 138/46 X
4,014,473  3/1977  Rosenberg ........................... 239/542

*Primary Examiner*—Andres Kashnikow
*Attorney, Agent, or Firm*—Benjamin J. Barish

[57] ABSTRACT

A fluid flow control device particularly useful as a drip-irrigation emitter is described comprising a two-section housing in which a mounting section is adapted to be passed through the wall of a supply pipe with the housing main section disposed within the tube and the outer end of the mounting section open to the atmosphere. A disc is freely movable within the housing main section and includes a stem fixed to one face thereof and passing into the housing mounting section such as to provide a fluid passageway therebetween. The housing main section is formed with an opening facing the face of the disc to which the stem is fixed, the arrangement being such that when pressurized fluid enters the housing main section through the opening, the disc moves towards and away from the opening to control the flow of the fluid into the housing and thereby through the fluid passageway between the disc stem and the inner face of the housing mounting section.

15 Claims, 4 Drawing Figures

FLUID FLOW CONTROL DEVICE PARTICULARLY USEFUL AS A DRIP-IRRIGATION EMITTER

BACKGROUND OF THE INVENTION

The present invention relates to fluid-flow control devices. The invention is particularly useful as drip-irrigation emitters and is therefore described below with respect to this application.

Various types of drip-irrigation emitters are known for supplying water, with or without additives, directly to the root zone of the plants at a slow controlled rate. One type provides an opening of small cross-sectional area to produce the slow output flow, but a main drawback of this type is its high sensitivity to clogging. Another type provides a long or labyrinth passageway to produce the slow output flow; this type is probably the most popular at the present time, but the known designs are still not completely satisfactory particularly because of sensitivity to clogging, difficulty to remove clogging particles, and sensitivity to line-pressure variations. A further known type of drip-irrigation emitter provides a control member movable towards and away from an opening to control the output flow, but the known designs of this type are also not completely satisfactory particularly in applications involving very low line pressures in the supply pipe.

An object of the present invention is to provide a novel fluid-flow control device of the above-mentioned third type, which device is particularly useful as a drip-irrigation emitter.

BRIEF SUMMARY OF THE INVENTION

According to a broad aspect of the present invention, there is provided a fluid-flow control device particularly useful as a drip irrigation emitter comprising a housing including a control member disposed within but unattached to the housing so as to be freely movable therein. The housing includes an inlet opening and an outlet opening both facing the same side of said control member and located so as to be covered and uncovered by that side of the control member as it moves toward and away from the wall of the housing.

More particularly, the invention provides a fluid-flow control device comprising a housing including a main section and a mounting section, the latter adapted to be passed through the wall of a supply pipe with the main section disposed within the pipe and the outer end of the mounting section open to the atmosphere. A disc is freely movable within the housing main section, and a stem is fixed to one face of the disc and passes into the housing mounting section such as to provide a fluid passageway therebetween. The housing main section is formed with an opening facing the mentioned face of the disc to permit pressurized fluid to enter housing main section, whereby the disc therein is movable towards and away from the opening to control the flow of the fluid through the opening and thereby through the fluid passageway between the disc stem and the inner face of the housing mounting section.

In the described preferred embodiment, the juncture of housing main and mounting sections is preferably formed with a recess to permit some fluid flow into said passageway even when the disc is in contact with the respective face of the housing main section. Further features of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
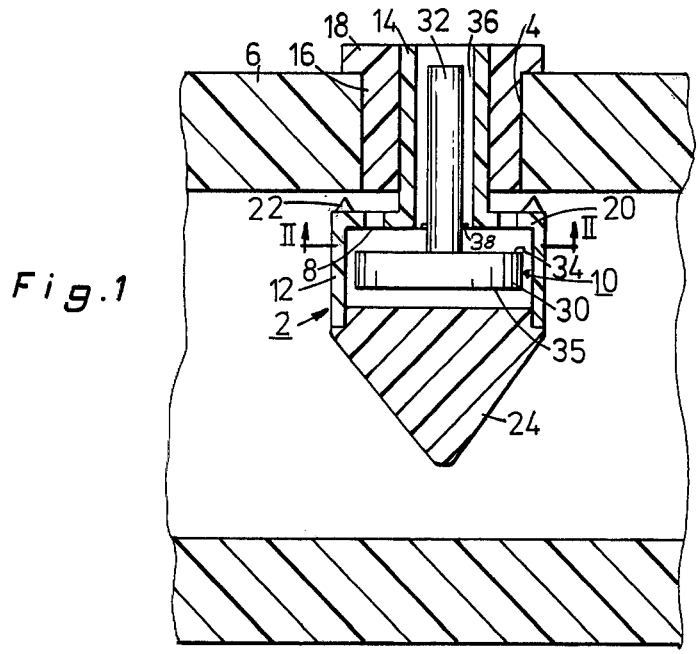
FIG. 1 is a sectional view illustrating one form of drip-irrigation emitter constructed in accordance with the invention, the emitter being mounted within a supply pipe adapted to carry the irrigation liquid.
Figure 2:
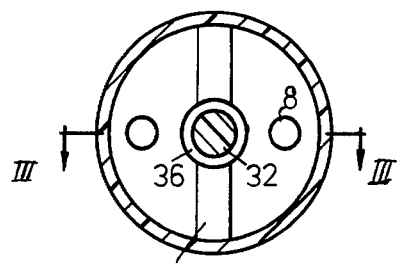
FIG. 2 is a sectional view along lines II—II of FIG. 1.
Figure 3:
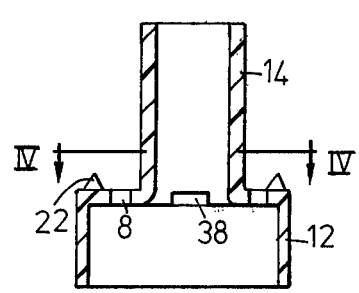
FIG. 3 is a sectional view along lines III—III of FIG. 2.
Figure 4:
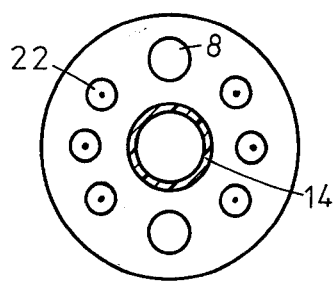
FIG. 4 is a sectional view along lines IV—IV of FIG. 3.

The preferred embodiment of the invention described herein is a drip-irrigation emitter for mounting through the wall of a supply pipe adapted to carry a pressurized liquid, such as water including fertilizer or other additives, which liquid is to be supplied directly to the root region of the plants at a slow controlled rate.

Briefly, the device comprises a housing, generally designated 2, adapted to be mounted through the apertured wall 4 of the supply pipe 6. The housing is formed with one or more relatively large inlet openings 8 for inletting liquid thereinto from the supply pipe. The housing further includes a control member, generally designated 10, movable towards and away from openings 8 for controlling the inlet flow of the liquid into the housing and thereby the outlet flow of the liquid from the housing to the atmosphere.

More particularly, housing 2 is constituted of two sections, namely a main section 12 adapted to be disposed within the supply pipe 6, and a mounting section 14 for mounting the housing within the apertured wall 4 of the supply pipe with the outer end of the mounting section open to the atmosphere. For mounting the housing within the supply pipe 6, a collar 16 is received within the apertured wall 4 of the pipe and receives, preferably with a friction-fit, the housing mounting section 14. Collar 16 is formed with an outer flange 18 engageable with the outer surface of the supply pipe 6, the outer open end of the housing mounting section 14 being substantially flush with the outer face of the collar.

Collar 16, and the two housing sections 14 and 12, are of circular cross-section to permit the mounting of the housing within a circular opening formed in the supply pipe 6. The supply pipe is made of flexible plastics material, and the outer diameter of the housing main section 12 is of a larger diameter than the opening 4 formed through the supply pipe 6 so that wall 20 of the housing main section 12 underlies the inner face of pipe 6 bordering its opening 4. This underlying portion of wall 20 of the main housing section 12 is formed with a circular array of embossments 22 for spacing the wall from the inner face of the pipe.

Housing 2 is preferably constituted of two plastic parts, namely: a first part including the mounting section 14, a circular end wall 20 of the main housing section 12, and an annular side wall of the main housing section; and a second part constituting the opposite end wall of the main housing section 12, this part being a conically-shaped plug 24 friction-fitted to the side wall of the main housing section 12. The conical shape of part 24 facilitates the insertion of the device through the aperture 4 in the supply pipe 6.

The movable valve member 10 within housing 2 is constituted of a disc-shaped member 30 disposed within the housing main section 12, and a stem 32 fixed to one face of the disc and passing into the housing mounting section 14, the opposite face 35 of disc 30 facing plug 24. The diameter of disc 30 is less than the inner diameter of the housing main section 12, and the diameter of stem 32 is likewise less than the inner diameter of the housing mounting section 14, whereby a fluid passageway 36 is defined between the stem 32 and the inner face of the housing mounting section 14.

In addition, a recess 38 is formed diametrically across the inner face of end wall 20 at its juncture with the housing mounting section 14.

The device illustrated in the drawings is used and operates as follows:

The device is first assembled with the conical part 24 friction-fitted to the end of housing main section 12, and with the housing mounting section 14 friction-fitted within collar 16. A hole 4 is formed through the wall of the supply pipe 6, the hole being of smaller diameter than the outer diameter of the main housing section 12. The assembly is then inserted through this hole (this being permitted by the flexible nature of the supply pipe 6) to the position illustrated in FIG. 1, wherein the housing main section 12 is disposed within the supply pipe 6 spaced from its inner face by the embossments 22, and the housing mounting section 14 passes through the supply pipe wall with the open end of the mounting section exposed to the atmosphere.

Now, when the pressurized liquid is introduced into the supply pipe 6, the liquid enters housing 2 via openings 8. The pressure within the housing main section 12 thus quickly builds-up to that within the supply pipe 6, but since face 35 of disc 30 is of an effective cross-sectional area larger than that of its opposite face 34 (the latter being reduced by the cross-sectional area of stem 32 exposed to the atmosphere), disc 30 tends to move towards the inner face of end wall 20 to restrict the flow of the liquid through openings 8. However, even when disc 30 contacts the inner face of end wall 20, some of the liquid within the housing main section 12 flows outwardly through recess 38 and passageway 36 between stem 32 and the housing mounting section 14. The pressure within the housing thus drops, thereby causing the pressure within the supply pipe 6, communicating with face 34 of disc 30 via inlet openings 8, to move the disc away from the openings, permitting more liquid to enter the housing main section 12.

It will thus be seen that disc 30 of the valve member 10 will tend to move towards and away from inlet openings 8 to thereby regulate the flow of the liquid entering the housing main section 12 and exiting from the housing via passageway 36. It will also be seen that this movement of the disc 30 towards and away from openings 8 is guided by stem 32 moving within the housing mounting section 14.

The dimensions of recess 38 determine, to a large degree, the output flow rate of the liquid. This recess may be of very small cross-sectional area to provide low flow rates and could even be omitted to provide very low flow rates when there is a non-sealing contact between face 34 of disc 10, and the inner face of the housing end wall 20.

The flow rate is also somewhat dependent on the size of the holes 8, on the inner diameter of the housing mounting section 14, and on the outer diameter of the stem 32.

As one example, the outer diameter of stem 32 may be 1 mm; the inner diameter of the housing mounting section 14 may be 1.5 mm; the outer diameter of disc 30 may be 5.2 mm; the main housing section 12 may have an inner diameter of 5.6 mm and an outer diameter of 6.5 mm; and the outer diameter of collar 16 may be 5 mm.

The described device provides a number of advantages particularly important when the device is used as a drip-irrigation emitter. One important advantage is that the described device can operate on very low supply-line pressures, even less than one meter. Another important advantage is that the device enables the use of very large inlet openings (8) and passageways (36) which have low sensitivity to clogging. If a particle should become wedged within passageway 36, it can easily be freed by merely pushing down stem 32, as by the use of a pointed tool.

Preferably, the outer face of stem 32 is always slightly recessed within the outer face of collar 16 so as to prevent the possibility that it may engage an external object (such as the ground itself on which it lies), which might hinder the free movement of disc 30 towards and away from the inlet openings 8 to regulate the flow of the liquid.

While the invention has been described with respect to one preferred embodiment, it will be appreciated that many variations, modifications and other applications of the invention may be made.

What is claimed is:

1. A fluid flow control device particularly useful as a drip-irrigation emitter, comprising a housing including a control member disposed within but unattached to the housing so as to be freely movable therein, said housing including a wall formed with an inlet opening and an outlet opening both facing the same side of said control member and located so as to be covered and uncovered by said side of the control member as the control member moves towards and away from said wall of the housing.

2. The device according to claim 1, wherein said control member is so located and dimensioned with respect to the housing so as to uncover the inlet and outlet of the housing substantially simultaneously and to cover the inlet and outlet of the housing substantially simultaneously.

3. Apparatus according to claim 1, wherein said control member is in the form of a disc and has a stem fixed to its said one face movable in a tubular section of the housing for guiding the disc as it moves towards and away from the housing inlet and outlet openings.

4. A device according to claim 1, wherein said housing wall is formed with a recess at said outlet opening to permit some fluid to flow therethrough even when the control member is in contact with the respective face of the said housing.

5. The device according to claim 1, wherein said housing includes a main section and a tubular section open at the end, and wherein said control member is a disc freely movable within said housing main section and includes a stem fixed to said one face of the disc and passing into said housing tubular section so as to provide a fluid passageway therebetween.

6. A fluid-flow control device particularly useful as a drip-irrigation emitter comprising:
   a housing including a main section and a tubular section;
   a disc freely movable within said housing main section;
   and a stem fixed to one face of said disc and passing into said housing tubular section such as to provide a fluid passageway therebetween;
   said housing main section being formed with an opening facing said one face of said disc to permit pressurized fluid to flow therethrough, whereby the disc is movable toward and away from said opening to control the flow of the fluid through said opening and thereby through said fluid passageway between the disc stem and the inner face of the housing mounting section.

7. A device according to claim 6, wherein said housing main section includes an end wall spaced from the inner face of a supply pipe when inserted therein, said end wall being formed with one of said openings on each side of said housing mounting section.

8. A device according to claim 6, wherein the juncture of said housing main and tubular sections is formed with a recess to permit some fluid flow into said passageway even when the disc is in contact with the respective face of said main section.

9. A device according to claim 6, wherein said housing is formed with embossments spacing the main section side thereof formed with said opening from the inner face of a supply pipe when the housing main section is inserted therein.

10. A device according to claim 6, wherein said disc stem is of such length that its outer end does not project through the open end of said housing mounting section.

11. A device according to claim 6, wherein said housing main section includes two parts attachable together; said first part constituting said tubular section, one end wall of the main section which end wall is formed with said opening, and an annular side wall of the main section; said second part constituting the opposed end wall of the main section and being attached to said side wall.

12. A device according to claim 11, wherein said second part is of conical configuration and is friction-fitted to said annular side wall.

13. A device according to claim 6, wherein said housing tubular section is received within a hollow collar which in turn is receivable within an aperture formed through a supply pipe wall when the housing is inserted therein.

14. A device according to claim 13, wherein said collar is formed with an external annular flange engageable with the outer face of said supply pipe.

15. A device according to claim 6, in combination with a supply pipe adapted to carry pressurized fluid, said device being inserted into an aperture formed through the wall of said supply pipe.

* * * * *